United States Patent [19]

Garfunkel et al.

[11] Patent Number: 5,576,908
[45] Date of Patent: Nov. 19, 1996

[54] ACTUATOR AND FILE LEVEL INITIALIZATION OF MAGNETORESISTIVE TRANSDUCERS

[75] Inventors: Glen A. Garfunkel, Palo Alto; Mike P. Salo, San Jose, both of Calif.; Akihiko Aoyagi, Fujisawa, Japan; Hiroshi Yanagisawa, Kamakura, Japan; Hiroshima Terashima, Chigasaki, Japan; Kenji Kuroki, Fujisawa, Japan

[73] Assignee: International Business Machines Corporation, Armonk, N.Y.

[21] Appl. No.: 221,813

[22] Filed: Apr. 1, 1994

[51] Int. Cl.$^6$ .............................. G11B 5/03; G11B 5/09
[52] U.S. Cl. ................................ 360/66; 360/46
[58] Field of Search ........................ 360/46, 66, 113; 330/60, 62

[56] References Cited

U.S. PATENT DOCUMENTS

| | | | |
|---|---|---|---|
| 3,840,898 | 10/1974 | Bajorek et al. | 360/113 |
| 4,024,489 | 5/1977 | Bajorek et al. | 338/32 R |
| 4,103,415 | 8/1978 | Hayes | 29/571 |
| 4,356,523 | 10/1982 | Yeh | 360/113 |
| 4,663,685 | 5/1987 | Tsang | 360/113 |
| 4,833,559 | 5/1989 | Belk | 360/113 |
| 4,987,508 | 1/1991 | Smith | 360/113 |
| 5,079,035 | 1/1992 | Krounbi et al. | 427/130 |
| 5,378,885 | 1/1995 | Jones, Jr. et al. | 360/113 |
| 5,412,518 | 5/1995 | Christner et al. | 360/66 |
| 5,444,589 | 8/1995 | Hu et al. | 360/113 |

*Primary Examiner*—W. Chris Kim
*Attorney, Agent, or Firm*—Leslie G. Murray; Ingrid M. Foerster

[57] ABSTRACT

In a disk drive actuator head stack assembly, magnetic transducers including magnetoresistive (MR) read heads are connected to a current source and configured to provide an MR sensor current to each MR head wherein the direction of current flow for the MR sensor current in each MR head is the same relative to the actuator for all of the MR heads in the actuator head stack. This configuration allows all of the MR heads in the head stack assembly to be initialized simultaneously by applying a homogeneous magnetic field to the head stack assembly, thus providing the capability of initializing the MR heads at the actuator or disk drive level rather than requiring that the MR heads be initialized individually.

20 Claims, 5 Drawing Sheets

ACTUATOR AND FILE LEVEL INITIALIZATION OF MAGNETORESISTIVE TRANSDUCERS

BACKGROUND OF THE INVENTION

The present invention relates generally to magnetic recording systems and more particularly to initialization of magnetoresistive read transducers during fabrication and assembly of such recording systems.

Magnetic disk drives are information storage devices which store information by magnetically recording data on magnetic storage media. A magnetic disk drive typically utilizes one or more rotatable disk media having concentric data tracks formed on one or both surfaces of each disk containing the recorded information, a transducer for reading data from or writing data to the various data tracks and a head positioning actuator connected to the head or heads for moving them to the desired data track and maintaining it over the track centerline during read or write operations. The head is attached to or formed on a surface of an air bearing slider which is supported adjacent the data surface of the disk media by a cushion of air generated by the rotating disk. The slider is connected to a support arm of the head positioning actuator by means of a suspension assembly.

The use of magnetoresistive (MR) sensors to sense or read magnetically recorded data is well-known in the art. It is also well-known that both longitudinal and transverse magnetic bias fields must be provided in the MR sensing element to eliminate Barkhausen noise and to maintain the MR sensor in its most linear operating range. Commonly assigned U.S. Pat. Nos. 4,024,489; 5,079,035; 3,840,898 and 4,103,315 discuss and disclose MR sensors in which various bias schemes utilizing both hard or soft magnetic materials and/or exchange coupling to provide the transverse and longitudinal bias fields required in the MR element. For example, U.S. Pat. No. 5,079,035 discloses an MR sensor in which a ferromagnetic MR element extends over only a central active region of the sensor. A layer of hard magnetic material is provided in each of the sensor end regions forming an abutting junction with the ends of the MR element to provide a longitudinal magnetic bias field in the plane of the sensor parallel to the surface of the magnetic media disk. The sensor's central active region includes the MR element, a non-magnetic spacer layer and a soft magnetic layer which provides the transverse magnetic bias field for the MR element.

The magnetic transducer is manufactured utilizing thin film deposition techniques and generally includes an MR read sensor in combination with an inductive write transducer to provide both recording and reproducing of data. The magnetic transducers are fabricated in a batch process on a wafer which is then cut or diced into individual sliders with the transducer formed on an end surface thereof. The dicing process may also include additional batch processing at the row level to form the air bearing surface for the slider. When the fabrication of the individual sliders is complete, each slider is then attached to a suspension assembly and the suspension assembly is attached to a support arm of a head actuator assembly with the heads typically arranged in a vertical configuration referred to as a head stack or actuator head stack.

The completed actuator assembly is subsequently assembled with other components such as the magnetic media disks to form a magnetic disk drive. At some point during the fabrication/assembly process the MR sensor must be initialized by impressing a magnetic field across the MR sensor in a preferred direction, typically parallel to its longitudinal axis and the plane of the magnetic media disk. Subsequent to this initialization process, the MR sensors may be subjected to various stresses resulting from handling during the manufacturing and assembly process described above. These stresses tend to degrade the magnetic performance of the MR heads. For such degraded heads, re-initialization of the MR head after such handling is known to recover the head in most instances; i.e., to return the head to its proper magnetic state. Conventional MR head and disk drive designs typically mount the sliders in pairs such that the MR heads on opposing sides of the magnetic disk media have opposing initialization directions. For this reason, and because of limitations on practical magnet designs, an MR head in a actuator assembly cannot be re-initialized without "reverse" initializing its neighboring heads. Thus, handling damage incurred subsequent to actuator assembly is left untreated resulting in degraded performance and even disk drive failure.

SUMMARY OF THE INVENTION

It is therefore a principal object of the present invention to provide an MR head design having the initialization magnetic field and the sensor current oriented in the same direction for all of the heads in an actuator assembly thus allowing simultaneous initialization or re-initialization of all MR heads in an actuator head stack.

In accordance with the principles of the present invention, each of the MR heads assembled in an actuator head stack has its sensor current flowing in the same direction as the other MR heads in the actuator head stack (with respect to the reference frame of the actuator assembly). Since the direction of the initialization magnetic field is a function of the sense current direction, all of the MR heads will also have the same initialization field direction. Thus, a large homogeneous magnetic field can now be utilized to initialize all of the MR heads in the actuator assembly simultaneously. Furthermore, with proper magnet design, the MR heads can even be initialized with the actuator assembly already incorporated in a magnetic disk drive. The direction of the sense current for the opposing MR heads may be selected by design of the suspension wiring, or in the head electronics module design, or in the head lead design during fabrication at the wafer level.

BRIEF DESCRIPTION OF THE DRAWINGS

The foregoing and other objects, features and advantages of the present invention will be apparent from the following detailed description of the preferred embodiment of the invention, reference being made to the accompanying drawing in which like reference numerals indicate like parts and in which.

DETAIL DESCRIPTION OF THE PREFERRED EMBODIMENT

Figure 1:
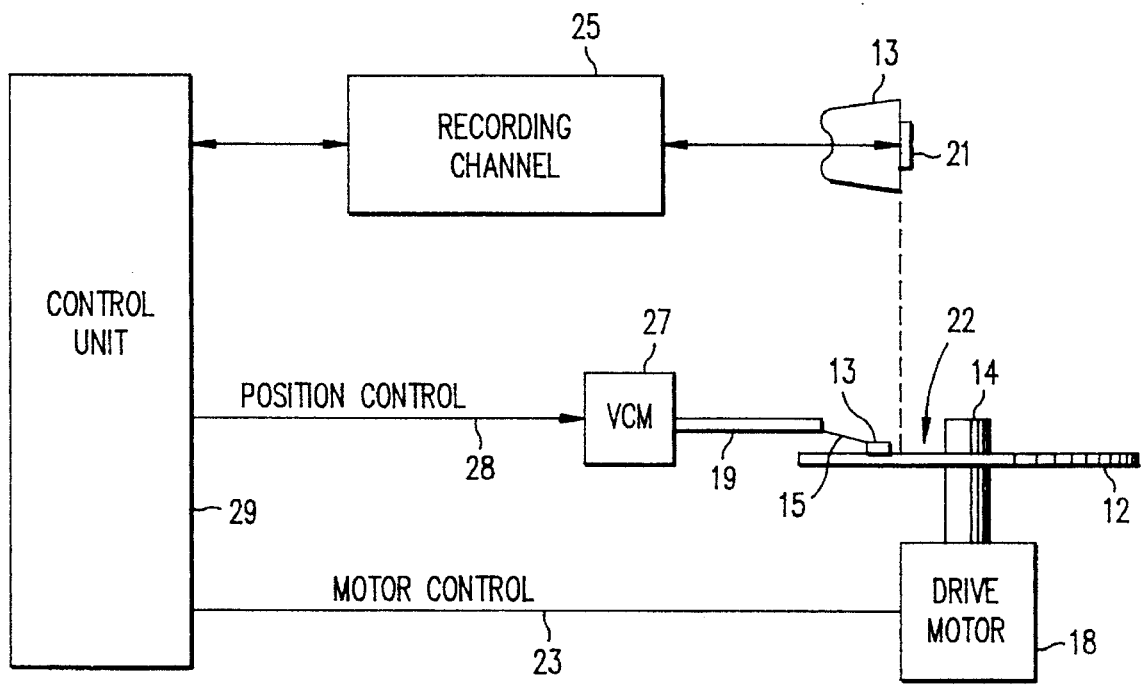
FIG. 1 is a simplified block diagram of a magnetic disk storage system embodying the present invention.
Figure 2:
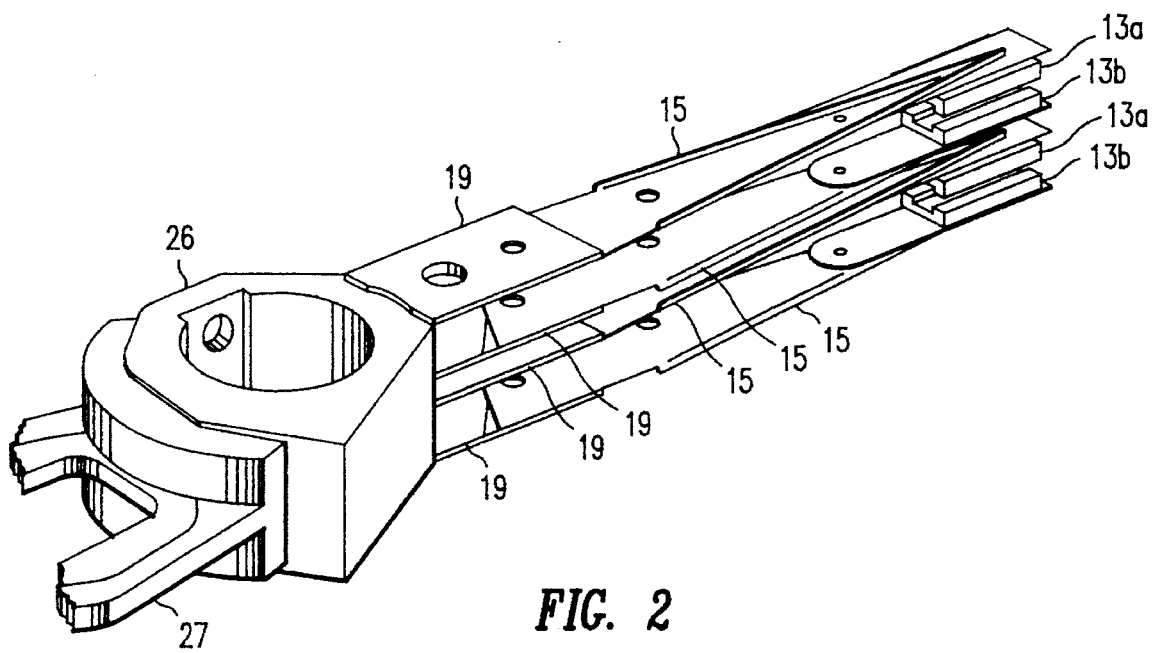
FIG. 2 is a perspective view of an actuator assembly illustrating the arrangement of the sliders and associated transducers in the actuator head stack.

Referring now to FIGS. 1 and 2, although the invention is described as embodied in a magnetic disk storage system as shown in FIG. 1, it will be apparent that the invention is also applicable to other magnetic recording system such as a magnetic tape recording system, for example.

At least one rotatable magnetic disk 12 is supported on a spindle 14 and rotated by a disk drive motor 18. The magnetic recording media on each disk is in the form of an annular pattern of concentric data tracks (not shown) on at least one surface of disk 12. At least one slider 13 is positioned on the disk 12, each slider 13 supporting one or more magnetic read/write transducers 21, typically referred to as read/write heads. Typically, at least one read/write head is supported adjacent each surface of the magnetic disk 12. As the disks rotate, the sliders 13 are moved radially in and out over the disk surface 22 so that the heads 21 may access different portions of the disk where desired data is recorded. Each slider 13 is attached to a actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil movable within a fixed magnetic field, the direction and velocity of the coil movements being controlled by the motor current signals supplied by a controller.

During operation of the disk drive system, the rotation of the disk 12 generates an air bearing between the slider 13 and the disk surface 22 which exerts upward force or lift on the slider. The air bearing thus counter-balances the slight spring force of the suspension 15 and supports the slider off and slightly above the disk surface by a small, substantially constant spacing during operation. The various components of the disk drive storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system and the accompanying illustration of FIG. 1 are for representation purposes only. It should be apparent that disk drive storage systems can contain a large number of magnetic storage disks, each disk having a slider associated with each surface thereof and each slider supporting one or more read/write heads. As shown in FIG. 2, each slider 13 is attached to its suspension 15 which, in turn, is attached to an actuator support arm 19. The actuator support arms 19 are attached to the voice coil motor 27. Typically the voice coil motor and the actuator support arms are attached on opposite sides of a pivot assembly 26 which will be rotatably mounted on a pivot post attached to the disk storage system housing (not shown). The arrangement of the sliders with their associated read/write heads, suspension and support arms form an assembly typically referred to as an actuator head stack. In the head stack, the sliders are grouped in pairs 13a, 13b, each one of the pair being supported on opposing sides of a disk 12, referred to as top head and a bottom head in FIG. 5. The read/write transducer 21 supported by the slider 13 includes an inductive write head and a magnetoresistive (MR) read head. The general practice in the art is to physically offset the geometric centers of the read and write elements with respect to one another in a dual-element magnetic head to be used in a rotary actuator environment. The offset is provided to compensate for changes in skew angles with change of actuator position across the disk. The read/write transducers of the top and bottom sliders 13a, 13b will have mirror image physical offsets.

Figure 3:
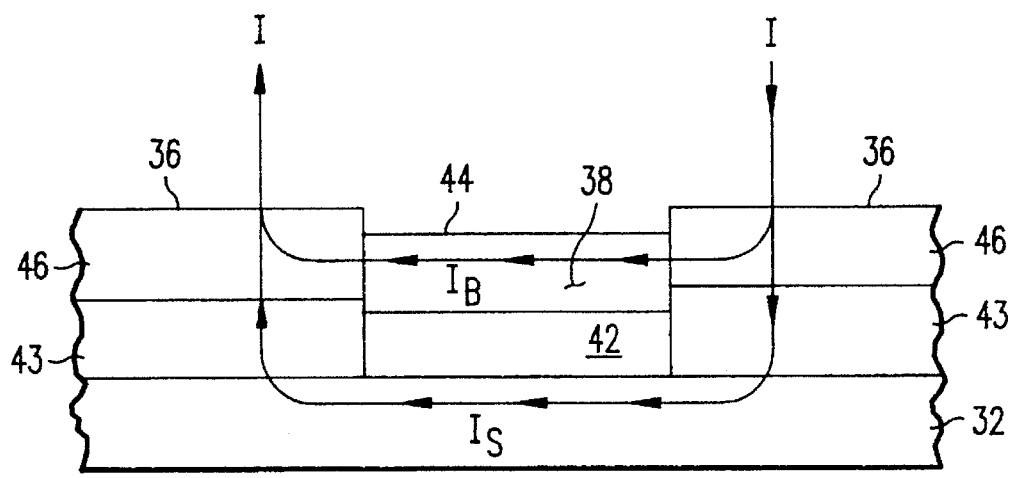
FIG. 3 is a cross-sectional view of a conventional magnetoresistive read transducer.

Referring now to FIG. 3, an MR read head or sensor of the type described in commonly assigned U.S. Pat. No. 4,663,685 comprises an MR element 32 which extends over the entire MR head 30. A longitudinal bias layer 43 of a hard magnetic material is formed over the sensor end regions 36 to provide a longitudinal magnetic bias field in the MR element 32. A transverse bias layer 38 of a soft magnetic material, separated from the MR element 32 by a thin non-magnetic spacer layer 42 provides a transverse magnetic bias field in the central active region 44 of the sensor 30. The read data signal is sensed over the central active region 44 which is defined by the spacing between the lead conductors 46 deposited over the longitudinal bias layers 43. A constant current I is supplied to the MR sensor by a current source (not shown) to provide a sense current, $I_S$, flowing through the MR element 32 and a bias current, $I_B$, flowing through the transverse bias layer 38.

To provide proper operation, the MR sensor must be initialized to set the central active region of the MR element 32 in a single magnetic domain state. To initialize the MR sensor, a magnetic field having the proper orientation (i.e., direction) and magnitude is applied across the MR sensor. The initialization field forces the central active region into a single domain state aligned with the applied field. In the MR sensor described above with reference to FIG. 3, the initialization also aligns the magnetic bias field produced by the hard magnetic longitudinal bias layers 43. In a preferred embodiment, the initialization field vector is parallel to the MR sensor longitudinal axis and to the plane of the magnetic media disk.

Figure 4A:
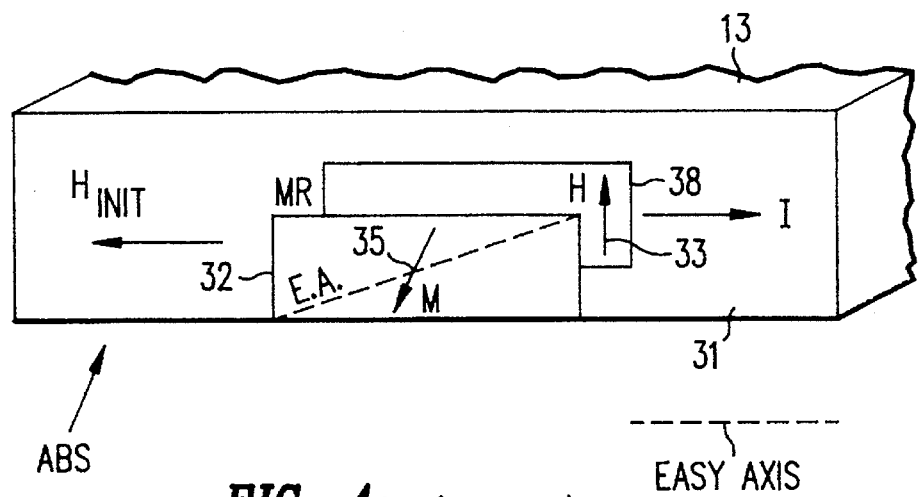
FIGS. 4A and 4B are diagrams illustrating the magnetic bias field and sense current directions for the MR head shown in FIG. 3.
Figure 4B:
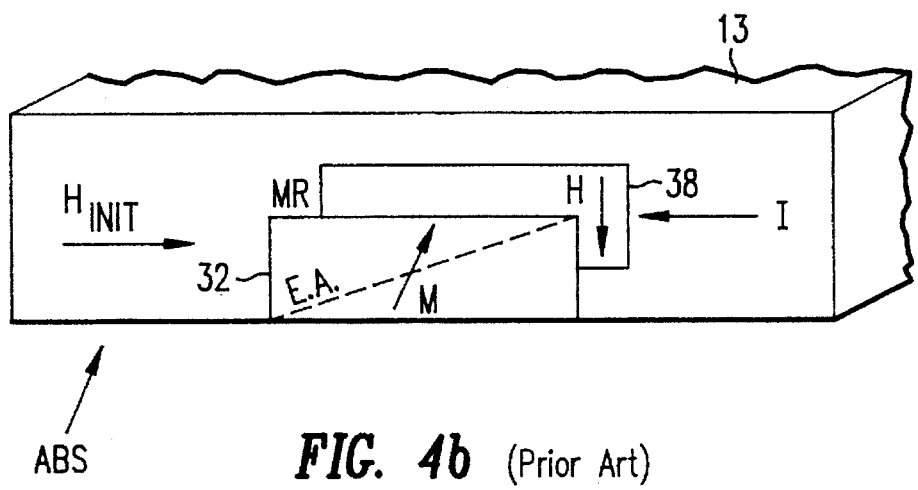

Referring now to FIGS. 4A and 4B, a diagram illustrating the MR sensor 30 formed on a vertical surface 31 of the slider 13 and illustrating the relationship between the current I, the initialization magnetic field H and the magnetic bias fields is shown. For simplicity, only the MR element 32 and the transverse bias layer 38 are shown. In FIG. 4A the MR sensor current I is shown flowing from left to right while the initialization magnetic field H is orientated from right to left. With the sensor current I flowing left to right, the bias current $I_B$ in the transverse bias layer 38 generates a magnetic field in the transverse bias layer as indicated by arrow 33. The transverse bias field 33 in combination with the initialization field H biases the magnetic field in the MR element 32 in a direction as shown by the arrow 35. If the MR sensor current I is reversed, i.e., flows from right to left, as shown in FIG. 4B, then the initialization field H must also be reversed and the magnetic bias fields will be reversed. This assures that the MR head micromagnetics are identical (i.e. symmetrical) in the two current configurations. For some biasing schemes, additional or different changes in the bias fields or head configuration may be required to obtain symmetrical magnetic performance when the sensor current I is reversed.

Figure 5:
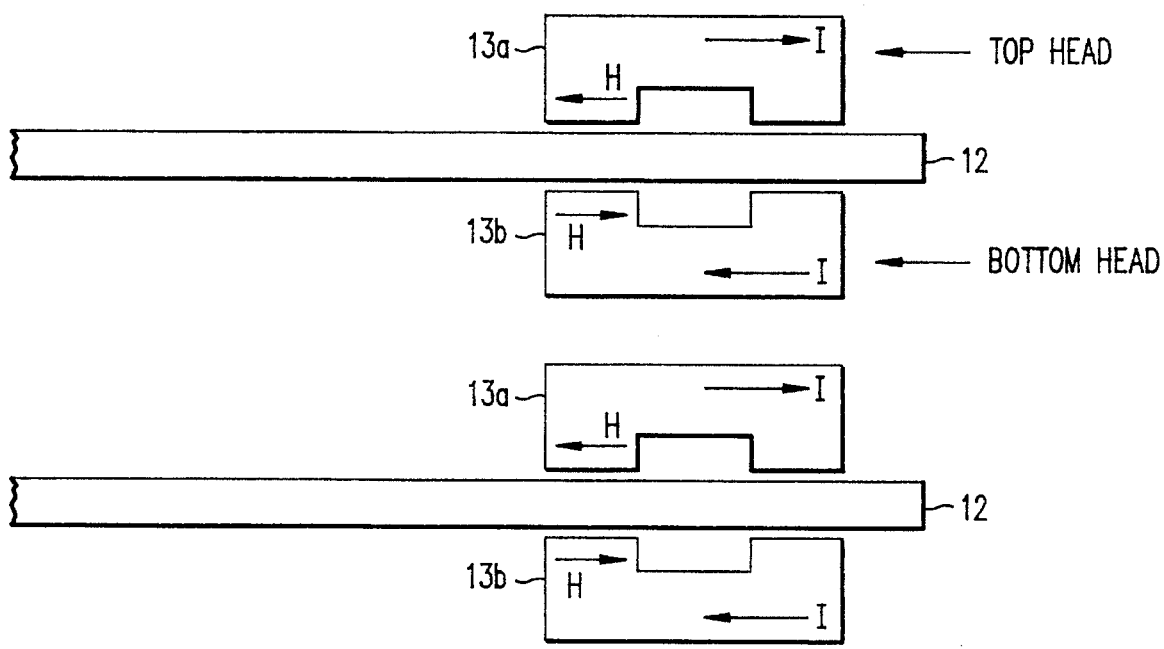
FIG. 5 is a diagram illustrating the sense current direction and associated initialization field direction for the MR heads in a prior art actuator head stack assembly.
Figure 7:
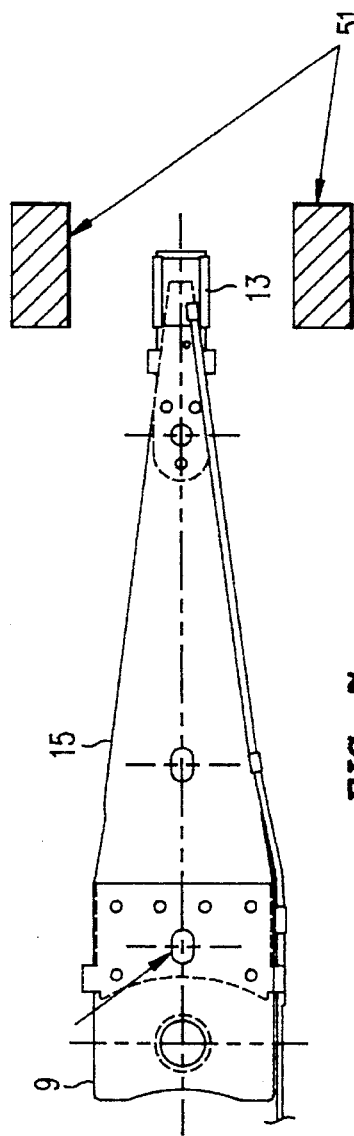
FIG. 7 is a top view of a suspended MR head illustrating a prior art initialization process.

Referring now to FIG. 5, two pairs of sliders 13a, 13b supporting read/write heads on opposite sides of a magnetic media disk 12 comprising a head stack (as shown in FIG. 2) are shown. For simplicity, the slider suspension and the remainder of the actuator assembly are not shown. For purposes of illustration, the pair of sliders 13a, 13b are referred to as the top head and the bottom head, respectively. The top head is suspended adjacent the upper surface of the disk 12 while the bottom head is suspended adjacent the lower surface of the disk 12. In a conventional head and disk drive manufacturing process, all of the heads are initialized for forward bias operation, i.e., the sensor current I flowing from left to right with the initialization magnetic field H orientation from right to left as shown in FIG. 4A. The MR heads may be initialized in a batch process at wafer level or at row level, or each head may be individually initialized at some time subsequent in the process, such as after being attached to the suspension 15 as shown in FIG. 7. Since all the heads are initialized for forward bias operation, prior to assembly in a head stack, when the heads and sliders are assembled in the actuator assembly adjacent heads will have the sensor current I and the initialization field orientation H orientated in opposite directions with reference to the actuator frame as shown in FIG. 5. Thus any attempt to re-initialize a single head after the assembly of the head stack will result in the adjacent head being initialized in the wrong direction.

Figure 6:
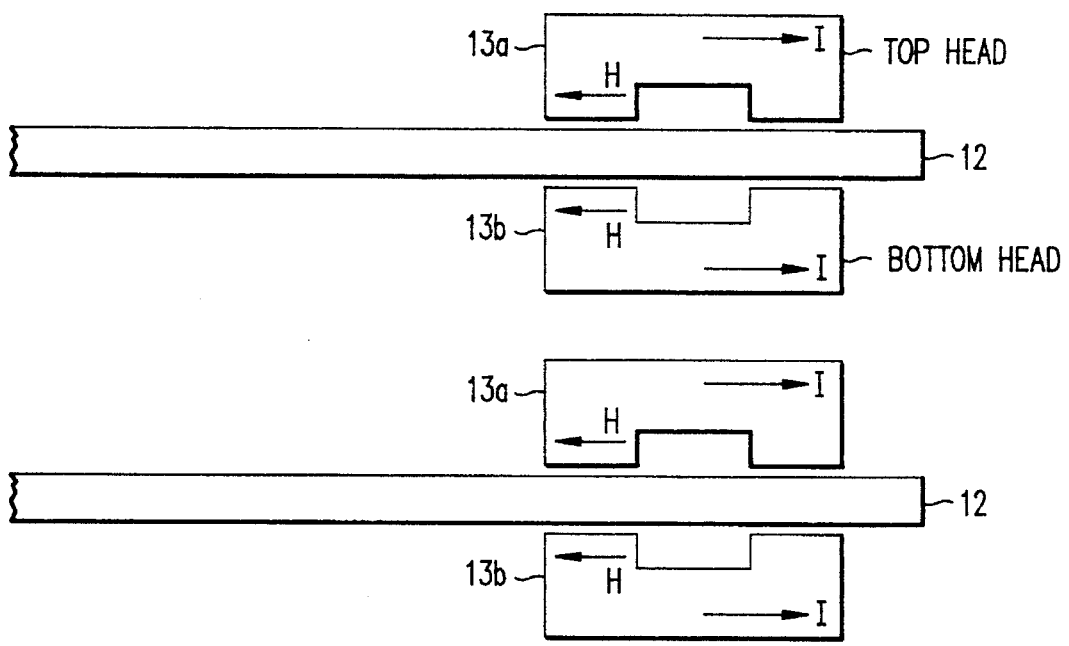
FIG. 6 is a diagram illustrating the sense current directions and associated initialization field direction for the MR heads in an actuator head stack assembly according to the principles of the present invention.
Figure 8:
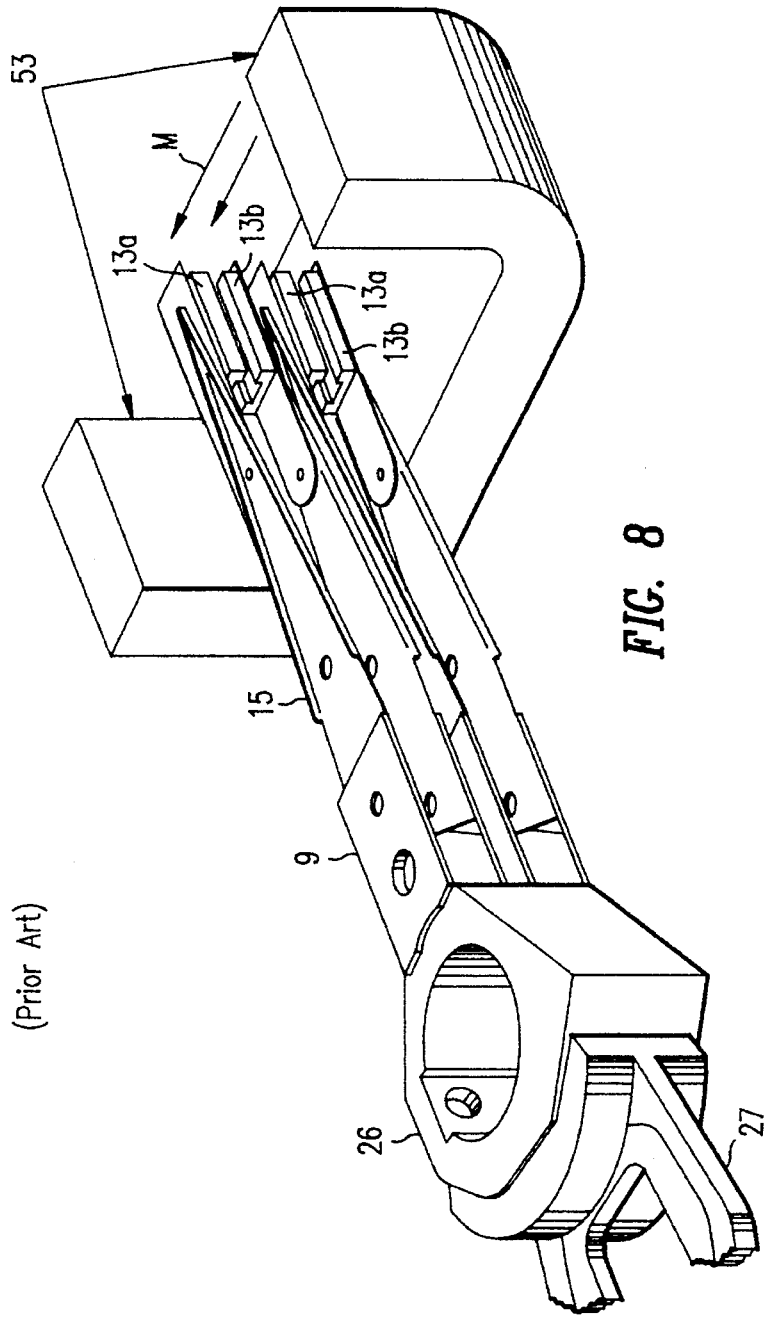
FIG. 8 is a perspective view illustrating actuator level initialization according to the principles of the present invention for the actuator head stack assembly shown in FIG. 2.

Referring now to FIG. 6, two pairs of sliders 13a, 13b supporting read/write heads adjacent opposing surfaces of a disk media 12 are shown assembled in a head stack (as shown in FIG. 2). Similarly to FIG. 5, the suspension and actuator assembly is not shown. According to the principles of the present invention, the MR sensor current I and the initialization magnetic field H are orientated in identical directions with respect to the actuator for both the top head and the bottom head. Thus, adjacent heads 13b, 13a, for example, have both the sensor current I and the initialization field direction H orientated in the same direction with reference to the actuator. In the present invention then, one or more of the individual heads in the head stack can be re-initialized without disrupting the initialization of an adjacent head. For example, as shown in FIG. 8, if it is necessary to re-initialize one or more heads 13a, 13b in a head stack, the entire actuator assembly is initialized by a large homogenous magnetic field by a magnet 53. While magnet 53 can be a permanent magnet having the required structural architecture to produce the desired the magnetic field, more typically the magnet 53 will comprise an electromagnet.

With continuing reference to FIGS. 4A, 4B and 6, in order to provide a head stack assembly wherein adjacent heads have the sensor current I and the initialization field H orientated in the same direction, it is not necessary to identify and segregate the top heads, sliders 13a, and the bottom, sliders 13b, prior to the initialization process. The initialization process is not completed until the MR heads are assembled in an actuator head stack assembly. While the MR heads may be initialized at a point prior to assembly of the actuator for testing or other purposes, when the top and bottom heads are assembled in the actuator head stack assembly and a final initialization is completed, adjacent heads will have their initialization field H orientated in the same direction.

Figure 9A:
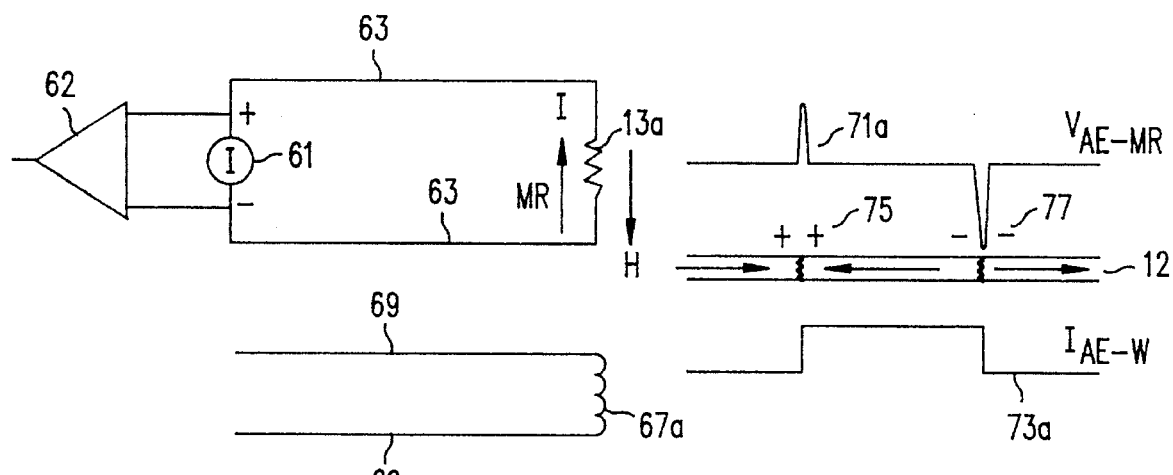
FIGS. 9A, 9B and 9C are simplified schematic diagrams illustrating preferred embodiments of the MR sensor sense current and write current circuitry according to the principles of the present invention.
Figure 9B:
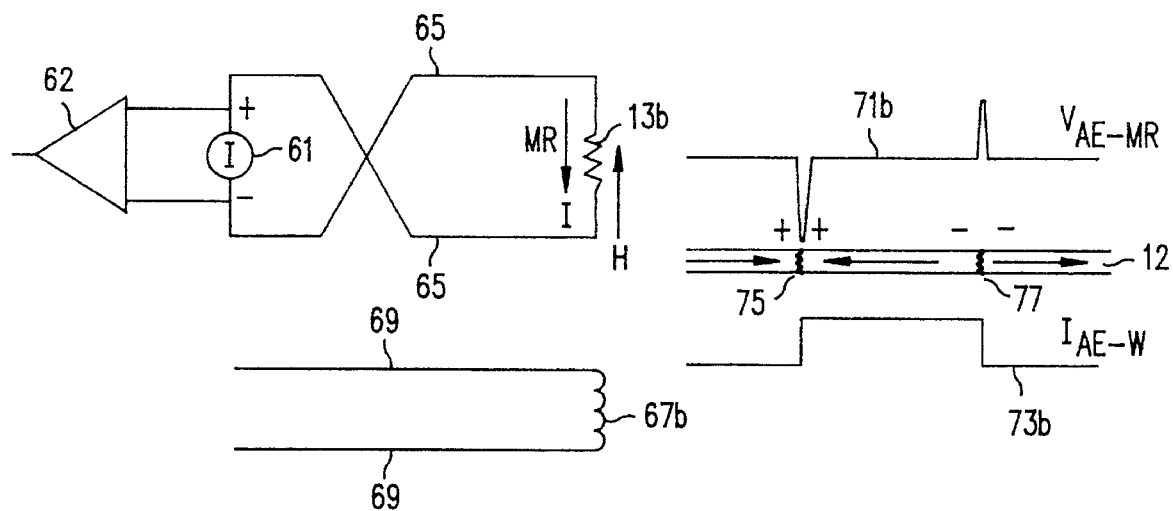
Figure 9C:
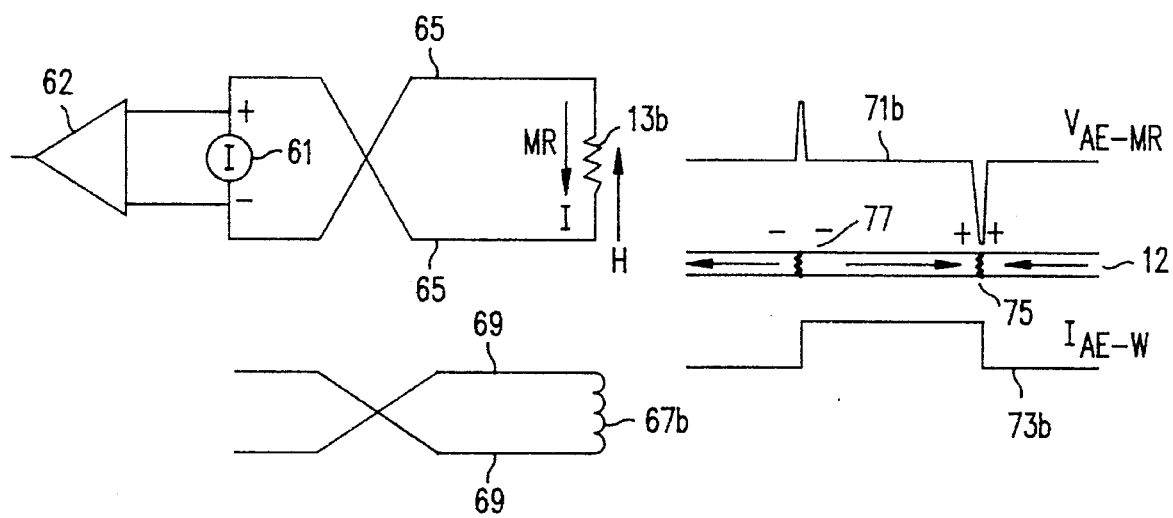

Referring now also to FIGS. 9A, 9B and 9C, in order to insure that the MR sensor current I flows in the same direction for adjacent heads it is necessary to provide reverse sensor current for the bottom heads, slider 13b, as shown in FIG. 4B. FIG. 9A is a simplified block diagram illustrating normal or forward sensor current such as provided for the top heads, slider 13a. A constant current I is provided by current source 61 via leads 63 to the MR sensor as represented by resistor 13a. Coil 67a connected by leads 69 represents the top head write coil for writing data on the magnetic media disk 12. A write current pulse $I_{AE-W}$ presented by curve 73a applied to the write coil 67a produces magnetic transitions 75 in the media 12. As illustrated, the rising edge of the write current pulse produces a positive magnetic transition 75 while the falling edge of the write pulse produces a negative magnetic transition 77. The MR sensor responds to or senses a magnetic transition by changing its resistance as a function of the change in the magnetic field applied across the MR sensor. Since the MR sensor has a constant current flowing through it, the response to a change in the magnetic field is a change in the voltage drop across the MR sensor, $V_{AE-MR}$, as represented by curve 71a. The voltage signal produced by the MR sensor is a function of both the direction of sense current $I_S$ through the MR sensor and the polarity of the magnetic transition 75, 77 in the media. The voltage signal developed across the MR sensor is detected by operational amplifier 62 which provides an output signal to the disk drive signal processing circuitry (not shown). Similarly the polarity of the magnetic transition 75, 77 in the magnetic media is a function of the direction of current flow through the write coil 67a. For forward bias operation as shown in FIG. 9A the rising edge of the write pulse produces a positive magnetic transition 75 which, in turn, produces a positive voltage pulse when sensed by the MR sensor.

FIG. 9B illustrates the circuitry for reversed current operation. The current source 61 provides the sensor current I to the MR sensor 13b. However, the leads 65 between the current source 61 and the MR sensor 13b are reversed to provide a current flow through the MR sensor in the opposite direction to that produced by the circuitry shown in FIG. 9A. Thus, when assembled in the actuator head stack, the bottom head 13b has its sensor current flow I in the same direction with respect to the actuator as the top head 13a. However, since the current direction through the MR head is reversed, the voltage signal produced by the bottom head for a magnetic transition is opposite to that produced by the top head for the same polarity magnetic transition, as shown by curve 71b. In the circuit shown in FIG. 9B, the write coil 67b for the bottom head is connected to the write circuitry such that the current flow through the coil 67b is in the identical direction as the current flow through the top head write coil 67a. Thus, the magnetic transitions 75, 77 produced in the magnetic media for a write pulse from the bottom head are identical to the transitions 75, 77 in the magnetic media produced by the write pulse in the top head. The result being that the data signal sensed by the MR sensor 13b for the bottom head is of the opposite polarity with respect to the polarity of the MR signal sensed by the top head. While the difference in polarity between the data signal for the top head and the data signal for the bottom head does not represent a problem, it must be accounted for in the data signal processing circuitry.

FIG. 9C illustrates a second embodiment of circuitry for the reverse bias operation of the bottom head 13b. Similarly to that shown in FIG. 9B, the leads 65 between the current source 61 and the MR head 13b are reversed to produce reverse current flow through the MR head 13b. However, the write coil 67b for the bottom head also has its leads 69 reversed thus providing current flow through write coil 67b in the opposite direction to that of the write coil 67a in the top head. Thus, since the polarity of the magnetic transitions produced by the write current is a function of the direction of current flow through the write coil, the magnetic transition 77 produced by the leading edge of the write pulse has negative polarity while the falling edge of the write pulse produces a magnetic transition 75 having positive polarity. The response then of the lower MR sensor 13b with reverse current will be symmetrical (i.e., identical) to the response of the top head MR sensor with forward current operation.

While the present invention has been particularly shown and described with referenced to a preferred embodiment thereof, it will be understood by those skilled in the art that various changes in the form and details may be made therein without departing from the spirit and scope of the invention as defined in the appended claims.

We claim:

1. A magnetic storage system comprising:

at least one magnetic storage medium having top and bottom surfaces, said top and bottom surfaces having a plurality of data tracks defined therein for recording of data;

for each surface of said at least one magnetic storage medium, at least one magnetic transducer formed on a surface of a slider and maintained in a closely spaced relationship adjacent said surface, said magnetic transducer including a magnetoresistive sensor and a write head, said sensor and said write head being physically offset from one another; and actuator means coupled to each slider for moving selected magnetic transducers to selected data tracks on said magnetic storage medium, said sliders assembled with said actuator forming an actuator head stack, a sense current flowing through each said magnetoresistive sensor, the direction of current flow through said magnetoresistive sensors being the same for all of said magnetoresistive sensors with respect to said actuator means, thereby facilitating concurrent initialization of all said magnetoresistive sensors by the application of a homogeneous magnetic field to said head stack.

2. A magnetic storage system as in claim 1 further including detection means coupled to said magnetoresistive sensor for detecting resistance changes in said magnetoresistive sensor responsive to magnetic fields representative of data bits recorded in said magnetic storage medium intercepted by said magnetoresistive sensor, said detection means including a current source coupled to said magnetoresistive sensor for providing said sense current flowing through said magnetoresistive sensor adjacent said bottom surface in a reverse direction relative to said sense current flowing through said magnetoresistive sensor adjacent said top surface.

3. A magnetic storage system as in claim 2 wherein each write head comprises a write coil, said write coil responsive to a write current for magnetically recording said data bits, the direction of said write current flow through the write coil adjacent said bottom surface being in a reverse direction relative to the write current flow through the write coil adjacent said top surface.

4. A method for initializing magnetoresistive sensors when a plurality of magnetic transducers, each said magnetic transducer including a magnetoresistive sensor, are assembled in an actuator forming an actuator head stack, each magnetoresistive sensor being suspended adjacent a top or bottom surface of an associated magnetic storage medium, each said magnetoresistive sensor being adjacent at least one other magnetoresistive sensor in said actuator head stack, said method comprising the steps of:

providing a sense current to each said magnetoresistive sensor, the direction of current flow for said sense current through said each magnetoresistive sensor being the same relative to said actuator for magnetoresistive sensors adjacent said top surfaces and for magnetoresistive sensors adjacent said bottom surfaces; and concurrently initializing all said magnetoresistive sensors by applying a homogeneous magnetic field to said actuator head stack.

5. The method of claim 4 wherein each said magnetic transducer includes an inductive write coil and including the step of providing a write current to each said inductive write coil, the direction of current flow for said write current through said each inductive write coil being the same relative to said magnetic medium for inductive write coils adjacent said top surfaces and for inductive write coils adjacent said bottom surfaces.

6. The method of claim 4 wherein each said magnetic transducer includes an inductive write coil and including the step of providing a write current to each said inductive write coil, the direction of current flow for said write current through each said write coil adjacent a bottom surface being opposite to the direction of current flow for said write current through each said write coil adjacent a top surface.

7. The method of claim 4 wherein said homogeneous magnetic field is generated by a permanent magnet means.

8. The method of claim 4 wherein said homogeneous magnetic field is generated by an electromagnet means.

9. A head-stack assembly for use in a magnetic storage system, comprising:

a plurality of sliders, each slider supporting at least one magnetic transducer, each said magnetic transducer including a magnetoresistive sensor and a write head, said sensor and said write head being physically offset from one another;

a support means including a plurality of support arms extending outwardly, at least one of said sliders coupled to and supported by each support arm, each said supported slider being identified as a top slider or a bottom slider; and electrical lead means for coupling each said magnetoresistive sensor to a current source for providing a sense current to each said magnetoresistive sensor, said electrical lead means adapted to provide said sense current to each said magnetoresistive sensor such that the direction of current flow for the sense current in said magnetoresistive sensors supported by a top slider is the same relative to said support means as the direction of current flow for the sense current in said magnetoresistive sensors supported by a bottom slider, thereby facilitating concurrent initialization of all said magnetoresistive sensors by the application of a homogeneous magnetic field to said support means.

10. A head-stack assembly as in claim 9 wherein each write head comprises an inductive write coil, said electrical lead means further adapted to provide a write current to each inductive write coil, the direction of current flow for the write current in the inductive write coil supported by a bottom slider being the same relative to the direction of current flow for the write current in the inductive write coil supported by a top slider.

11. A head-stack assembly as in claim 9 wherein each write head comprises an inductive write coil, said electrical lead means further adapted to provide a write current to each inductive write coil, the direction of current flow for the write current in the inductive write coil supported by a bottom slider being opposite relative to the direction of current flow for the write current in the inductive write coil supported by a top slider.

12. A head-stack assembly as in claim 9 further comprising actuator means, said support means mounted to said actuator means.

13. A head-stack assembly as in claim 12 wherein said actuator means includes voice coil motor means.

14. A head-stack assembly as in claim 9 further comprising a plurality of suspension means, each said slider attached to and supported by a suspension means, at least one of said suspension means attached to each said support arm.

15. A system for initializing a plurality of magnetoresistive sensors in a head-stack assembly to be implemented in a magnetic storage system, comprising:

a plurality of sliders, each slider supporting at least one magnetic transducer, each said magnetic transducer including a magnetoresistive sensor;

a support means including a plurality of support arms extending outwardly, at least one of said sliders coupled to and supported by each support arm, each said supported slider being identified as a top slider or a bottom slider;

electrical lead means for coupling each said magnetoresistive sensor to a current source for providing a sense current to each said magnetoresistive sensor, said electrical lead means adapted to provide said sense current to each said magnetoresistive sensor such that the direction of current flow for the sense current in said magnetoresistive sensors supported by a top slider is the same relative to said support means as the direction of current flow for the sense current in said magnetoresistive sensors supported by a bottom slider; and means for concurrently initializing all of said magnetoresistive sensors by applying a homogeneous magnetic field to said support means.

16. A system as in claim 15 wherein each write head comprises an inductive write coil, said electrical lead means further adapted to provide a write current to each inductive write coil, the direction of current flow for the write current in the inductive write coil supported by a bottom slider being the same relative to the direction of current flow for the write current in the inductive write coil supported by a top slider.

17. A system as in claim 15 wherein each write head comprises an inductive write coil, said electrical lead means further adapted to provide a write current to each inductive write coil, the direction of current flow for the write current in the inductive write coil supported by a bottom slider being opposite relative to the direction of current flow for the write current in the inductive write coil supported by a top slider.

18. A system as in claim 15 further comprising actuator means, said support means mounted to said actuator means.

19. A system as in claim 18 wherein said actuator means includes voice coil motor means.

20. A system as in claim 15 further comprising a plurality of suspension means, each said slider attached to and supported by a suspension means, at least one of said suspension means attached to each said support arm.

* * * * *